US006721157B2

(12) United States Patent
Shin

(10) Patent No.: US 6,721,157 B2
(45) Date of Patent: Apr. 13, 2004

(54) ELECTROSTATIC DISCHARGE DEVICE OF SURFACE MOUNT TYPE AND FABRICATING METHOD THEREOF

(75) Inventor: Yu-Seon Shin, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 316 days.

(21) Appl. No.: 09/891,274

(22) Filed: Jun. 27, 2001

(65) Prior Publication Data

US 2002/0008952 A1 Jan. 24, 2002

(30) Foreign Application Priority Data

Jul. 10, 2000 (KR) ........................................ 2000-39289
Jun. 18, 2001 (KR) ........................................ 2001-34459

(51) Int. Cl.[7] .................................................. H02H 1/00
(52) U.S. Cl. ....................... 361/120; 361/112; 313/567; 313/634
(58) Field of Search ................................. 361/112, 120; 313/567, 634, 621, 631, 155

(56) References Cited

U.S. PATENT DOCUMENTS 3,900,767 A * 8/1975 Person ....................... 361/118
4,586,105 A * 4/1986 Lippmann et al. .......... 361/117
5,726,854 A 3/1998 Maki et al.
6,052,267 A * 4/2000 Kasai et al. .................. 361/56

* cited by examiner

*Primary Examiner*—Brian Sircus
*Assistant Examiner*—Isabel Rodriguez
(74) *Attorney, Agent, or Firm*—Lowe Hauptman Gilman & Berner LLP

(57) ABSTRACT

An electrostatic discharge device (ESD device) of the surface mount type and a method of fabricating such devices are disclosed. The ESD device includes an upper cover plate made of an insulating material, a middle insulating plate made of an insulating material and laminated on the lower surface of the upper cover plate, and having a discharge opening, with first and second discharge terminals formed in the middle insulating plate at opposite edges of the discharge opening, and a lower cover plate made of an insulating material and laminated on the lower surface of the middle insulating plate, and hermetically sealing the discharge opening of the middle insulating plate in cooperation with the upper cover plate, and having a second signal electrode brought into electric contact with the first discharge terminal, and a second ground electrode brought into electric contact with the second discharge terminal. In the ESD device, plasma discharge gas fills the discharge opening sealed by the upper and lower cover plates. This ESD device is easily installed on a PCB through a surface mounting process, and is used for protecting electronic circuits or electronic parts from electrostatic damage, and is easily and simply produced through a ceramic laminating process at a low production cost.

7 Claims, 8 Drawing Sheets

ELECTROSTATIC DISCHARGE DEVICE OF SURFACE MOUNT TYPE AND FABRICATING METHOD THEREOF

BACKGROUND OF THE INVENTION

1. Field of the Invention

The present invention relates to electrostatic discharge devices of the surface mount type and a method of fabricating such devices and, more particularly, to an electrostatic discharge device of the surface mount type designed to be easily installed on a printed circuit board through a surface mounting process and used for protecting electronic circuits or electronic parts from electrostatic damage, and to a method of easily and simply fabricating such devices through a ceramic laminating process.

2. Description of the Prior Art

As well known to those skilled in the art, electronic circuits or electronic elements (herein below commonly referred to simply as "electronic circuits") of a variety of electronic apparatuses, such as sensors, are electrostatically impacted by an application of static electricity, such as an instantaneously applied high voltage, during an operation. The electronic circuits may be thus seriously damaged, causing operational errors, losing their operational functions, and being broken. As the electronic circuits have become complicated in their construction in accordance with the rapid development of electronic apparatuses in recent years, the electronic circuits become more sensitive to surges. Due to such sensitivity of the electronic circuits to surges, the electronic circuits may be more easily and frequently damaged by static electricity during an operation.

In an effort to overcome such electrostatic damage to the electronic circuits, several techniques have been actively studied and developed in recent years. As an example of such techniques, ESD devices (electrostatic discharge devices) have been proposed and used widely.

An example of conventional ESD devices is shown in FIGS. 1*a* and 1*b*. FIG. 1*a* shows an arrangement of the conventional ESD device connected to both an antenna and an electronic circuit. FIG. 1*b* shows a cross-section of the ESD device.

As shown in FIG. 1*a*, when the electronic circuit of an apparatus receives signals from an antenna through a signal transmission wire, the circuit may be impacted by an instantaneous application of a high voltage signal. In order to prevent such an application of high voltage signal to the circuit, an ESD device 30 is installed on the signal transmission wire in parallel to the circuit so as to protect the circuit from such a high voltage signal by performing a plasma discharge of static electricity.

As shown in FIG. 1*b*, the conventional ESD device 30 comprises a hollow cylindrical case 31, with two holed disc covers 32*a* and 32*b* set in opposite ends of the case 31 to close the ends to form a cavity within the case 31. Plasma discharge gas is fed into the case 31 through the holes of the two covers 32*a* and 32*b* to fill the cavity of the case 31. Two signal transmission wires are inserted into the opposite ends of the case 31 through the holes of the two covers 32*a* and 32*b* to reach predetermined positions within the cavity, prior to sealing the gaps between the holes and the wires using insulators 33*a* and 33*b*.

When static electricity, having a potential higher than the ionization potential of the plasma discharge gas contained in the ESD device 30, is introduced into the ESD device, the plasma discharge gas is ionized to perform plasma discharge, thus reducing the voltage of the signal transmitting wires. This protects the electronic circuit from high voltage static electricity surges.

However, the conventional ESD device 30 is manufactured through a complex process. That is, the process of producing the ESD device 30 comprises the steps of setting the two holed covers in the opposite ends of the hollow cylindrical case, feeding plasma discharge gas into the case through the holes of the two covers, inserting two signal transmitting wires into the case through the holes of the two covers, and sealing the gaps between the holes and the wires using insulators. Such a complex manufacturing process undesirably increases the manufacturing cost of the ESD devices. Another problem experienced in the conventional ESD device resides in that the ESD device is too large in its dimension, thus undesirably and excessively consuming the surface area of a printed circuit board (PCB).

FIGS. 2*a*, 2*b* and 2*c* are a perspective view, a plan view, and a sectional view of a conventional ESD device in accordance with another embodiment of the prior art. As shown in the drawings, this conventional ESD device is designed to be improved in its welding-sealed structure including a cylindrical discharge tube 10 containing ionization gas therein. In the ESD device, the discharge tube 10 comprises a cylindrical case 11, which is made of a conductive metal and is provided with a plurality of axial holes 12 extending in parallel to the axis 15 of the case 11. Two insulating tubes 16 are set within each of the axial holes 12 such that the two tubes 16 are inserted into each hole 12 from the upper and lower ends of the hole 12 to form a cavity 20 between the inside ends of the two tubes 16. Ionization gas fills the cavity 20 before an electrode 19 penetrates the communicating holes of the two tubes 16 while passing through the cavity 20. The above-mentioned construction of this conventional ESD device is expressed in U.S. Pat. No. 5,726,854 in detail.

When a high voltage is applied to the ESD device 10 during an operation, the ionization gas within the case 11 is ionized and responds to the high voltage surge acting on the junctions of the electrodes 19 and the grounds, thus forming conductive passages at the gaps between the electrodes 19 and the case 11 and bypassing the high voltage to the grounds. Therefore, the ESD device 10 protects circuit elements and semiconductor chips operated in conjunction with status reaction sensors from such a high voltage surge.

The above-mentioned ESD device 10 is advantageous in that it is possible to selectively use the electrodes during an operation. However, this ESD device further complicates the process of manufacturing the ESD devices and increases the production costs of the devices. Another problem of this ESD device resides in that it is too large in its dimension, thus undesirably and excessively consuming the surface area of a PCB.

SUMMARY OF THE INVENTION

Accordingly, the present invention has been made keeping in mind the above problems occurring in the prior art, and an object of the present invention is to provide an electrostatic discharge device (ESD device) of the surface mount type, which is designed to be easily installed on a PCB through a surface mounting process and is used for protecting electronic circuits or electronic parts from electrostatic damage, and also provides a method of easily and simply fabricating such ESD devices through a ceramic laminating process.

In order to accomplish the above object, the present invention provides an electrostatic discharge device of the surface mount type, comprising: an upper cover plate made of an insulating material; a middle insulating plate made of an insulating material and laminated on the lower surface of the upper cover plate, and having a discharge opening, with first and second discharge terminals formed in the middle insulating plate at opposite edges of the discharge opening; and a lower cover plate made of an insulating material and laminated on the lower surface of the middle insulating plate, and hermetically sealing the discharge opening of the middle insulating plate in cooperation with the upper cover plate, the lower cover plate having a second signal electrode brought into electric contact with the first discharge terminal of the middle insulating plate, and a second ground electrode brought into electric contact with the second discharge terminal of the middle insulating plate, whereby discharge gas fills the discharge opening of the middle insulating plate sealed by the upper and lower cover plates.

In the electrostatic discharge device, the middle insulating plate further comprises a first signal electrode bringing the first discharge terminal of the middle insulating plate into electric contact with the second signal electrode of the lower cover plate; and a first ground electrode bringing the second discharge terminal of the middle insulating plate into electric contact with the second ground electrode of the lower cover plate.

This electrostatic discharge device is easily installed on a PCB through a surface mounting process, and is easily and simply produced through a ceramic laminating process at a low production cost.

BRIEF DESCRIPTION OF THE DRAWINGS

The above and other objects, features and other advantages of the present invention will be more clearly understood from the following detailed description taken in conjunction with the accompanying drawings, in which:

FIGS. 1*a* and 1*b* are views of a conventional ESD device according to an embodiment of the prior art, in which: FIG. 1*a* shows an arrangement of the ESD device connected to both an antenna and an electronic circuit to be protected by the device, and FIG. 1*b* shows a cross-section of the ESD device;

FIGS. 3*a* and 3*b* are views of an ESD device of the surface mount type in accordance with the primary embodiment of the present invention, in which: FIG. 3*a* is an exploded perspective view of the device, and FIG. 3*b* is a sectional view of the device with the parts assembled into a single body;

FIGS. 4*a*, 4*b* and 4*c* are views of an ESD device of the surface mount type in accordance with the second embodiment of the present invention, in which: FIG. 4*a* is an exploded perspective view of the device, FIG. 4*b* is a sectional view of the device with the parts assembled into a single body, and FIG. 4*c* is a bottom view of a middle insulating plate of the device;

FIGS. 5*a* and 5*b* are views of an ESD device of the surface mount type in accordance with the third embodiment of the present invention, in which: FIG. 5*a* is an exploded perspective view of the device, and FIG. 5*b* is a sectional view of the device with the parts assembled into a single body.

DETAILED DESCRIPTION OF THE INVENTION

Figure 1A:
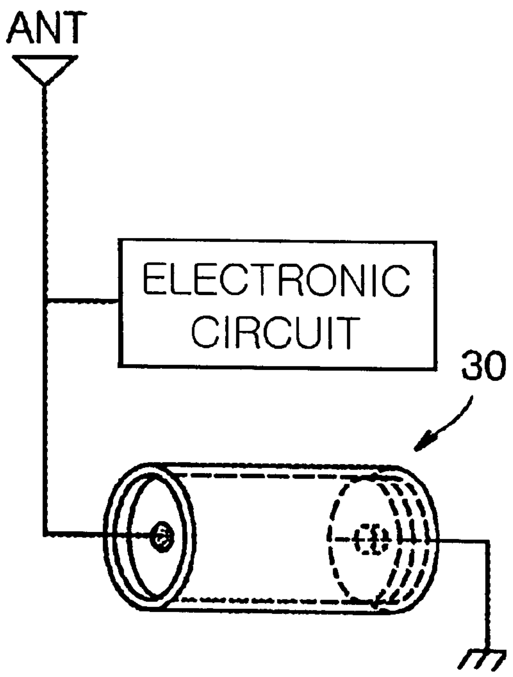
PRIOR ART FIG. 1A
Figure 1B:
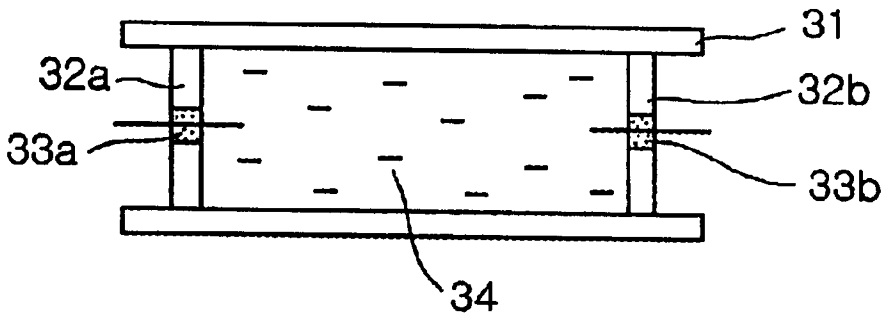
PRIOR ART FIG. 1B
Figure 2A:
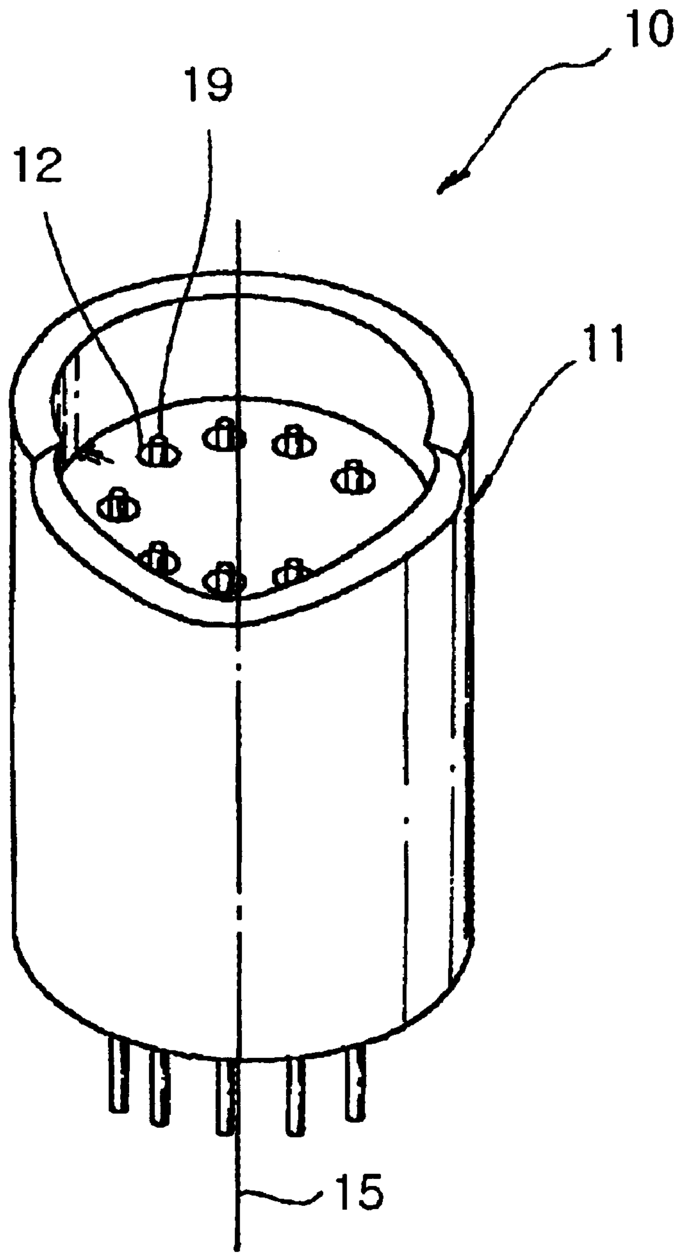
PRIOR ART FIG. 2A
FIGS. 2*a*, 2*b* and 2*c* are a perspective view, a plan view, and a sectional view of a conventional ESD device in accordance with another embodiment of the prior art.
Figure 2B:
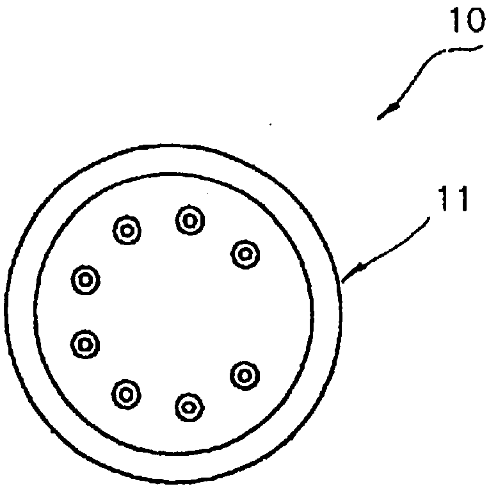
PRIOR ART FIG. 2B
Figure 2C:
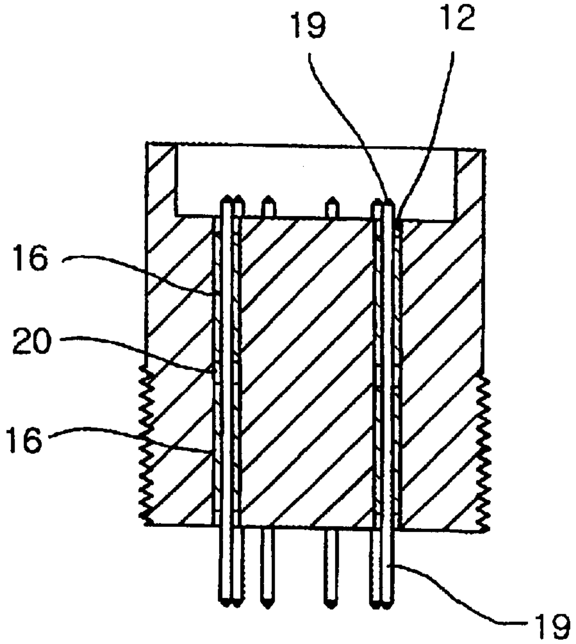
PRIOR ART FIG. 2C

Reference now should be made to the drawings, in which the same reference numerals are used throughout the different drawings to designate the same or similar components.

Figure 3A:
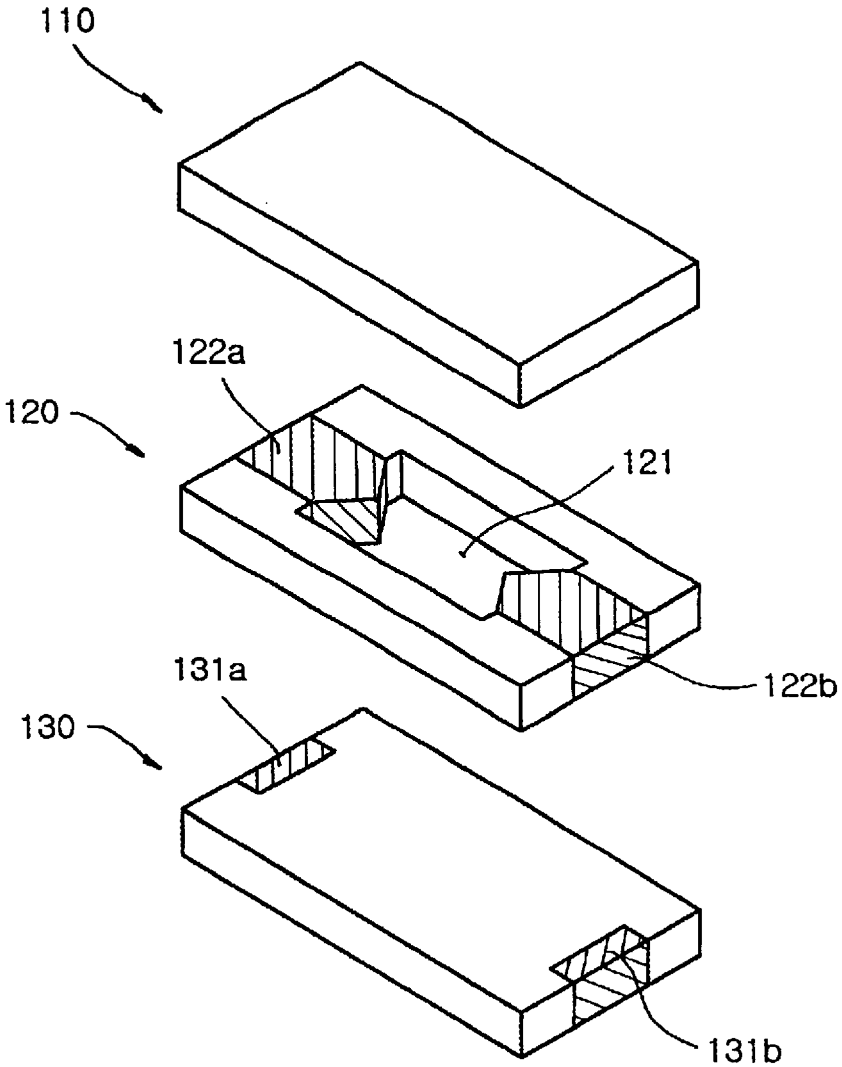
Figure 3B:
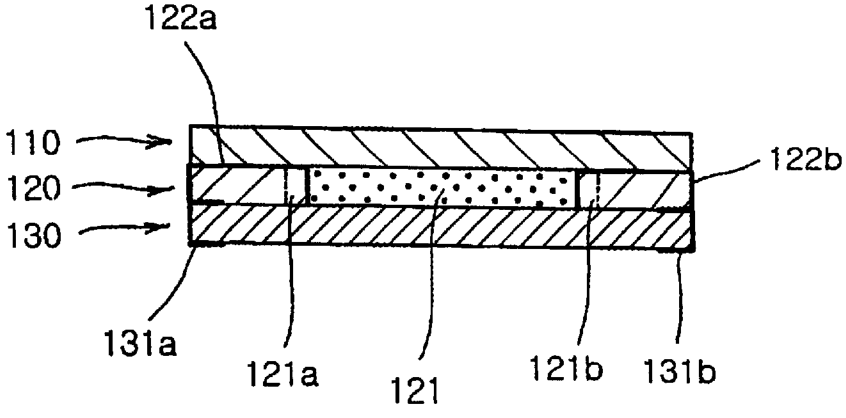

FIGS. 3*a* and 3*b* are views of an ESD device of the surface mount type in accordance with the primary embodiment of the present invention. The ESD device of this invention has been developed from the active study of the inventor of this invention, and effectively discharges static electricity to protect electronic circuits of an apparatus from electrostatic damage during an operation. As shown in the drawings, the ESD device of the surface mount type according to this primary embodiment has a triple-laminated structure comprising an upper cover plate 110, a middle insulating plate 120 and a lower cover plate 130. The middle insulating plate 120 is interposed between the upper and lower plates 110 and 130, and has a discharge opening 121 at the center.

The upper cover plate 110 is made of a ceramic insulating material, and is laminated on the upper surface of the middle plate 120. The upper cover plate 110 hermetically seals the discharge opening 121, containing discharge gas therein, in cooperation with the lower cover plate 130, thus preventing gas leakage from the opening 121. The hermetically sealed structure of the three plates 110, 120 and 130 is formed by a sintering process as will be described later herein.

The middle plate 120 is made of an insulating material, and has the discharge opening 121 at the center. First and second discharge terminals 121*a* and 121*b* are formed in the middle plate 120 at opposite edges of the opening 121, with a first signal electrode 122*a* and a first ground electrode 122*b* formed on the middle plate 120 while covering the inner, top and outer surfaces of the two discharge terminals 121*a* and 121*b*. The first and second discharge terminals 121*a* and 121*b* each have at least one triangular projection tip.

The lower cover plate 130 is made of an insulating material, and is laminated on the lower surface of the middle plate 120. The lower cover plate 130 hermetically seals the discharge opening 121 in cooperation with the upper cover plate 110. A second signal electrode 131*a* and a second ground electrode 131*b* are formed on the lower cover plate 130 at opposite edges. The second signal electrode 131*a* and the second ground electrode 131*b* respectively and partially cover the opposite edges of the lower plate 130 so as to come into electric contact with the first signal electrode 122*a* and the first ground electrode 122*b* of the middle plate 120.

As described above, the lower cover plate 130 is laminated on the lower surface of the middle plate 120, and hermetically seals the discharge opening 121, containing the discharge gas therein, in cooperation with the upper cover plate 110. That is, the upper and lower plates 110 and 130 seal the discharge opening 121 of the middle plate 120 to form a discharge cavity in the ESD device. This hermetically sealed discharge opening 121 contains discharge gas therein.

In the present invention, the shape and structure of the three plates 110, 120 and 130 are not limited to the drawings. However, it is preferable to form the mounting surface of the ESD device, or the lower surface of the lower cover plate 130, as a flat surface as shown in FIGS. 3*a* and 3*b* so as to allow the ESD device to be easily mounted on a PCB. In addition, it is also preferred to make the junction surfaces of the three plates 110, 120 and 130 as flat surfaces, allowing an easy manufacturing process of the ESD device and an easy lamination of the three plates into a laminated single structure. The above-mentioned conception of the shape and structure of the three plates 110, 120 and 130 is commonly applied to the embodiments of the present invention.

In the ESD device according to the primary embodiment of this invention, the electric contact between the middle plate 120 and the lower plate 130 is accomplished by the electric contact between the electrodes of the two plates 120 and 130 as described above. In a detailed description, the first signal electrode 122*a* and the first ground electrode 122*b*, respectively covering the first and second discharge terminals 121*a* and 121*b* of the middle plate 120, come into electric contact with the second signal electrode 131*a* and the second ground electrode 131*b* of the lower plate 130 after passing through the outer edges of the middle plate 120, as shown in FIGS. 3*a* and 3*b*.

Figure 4A:
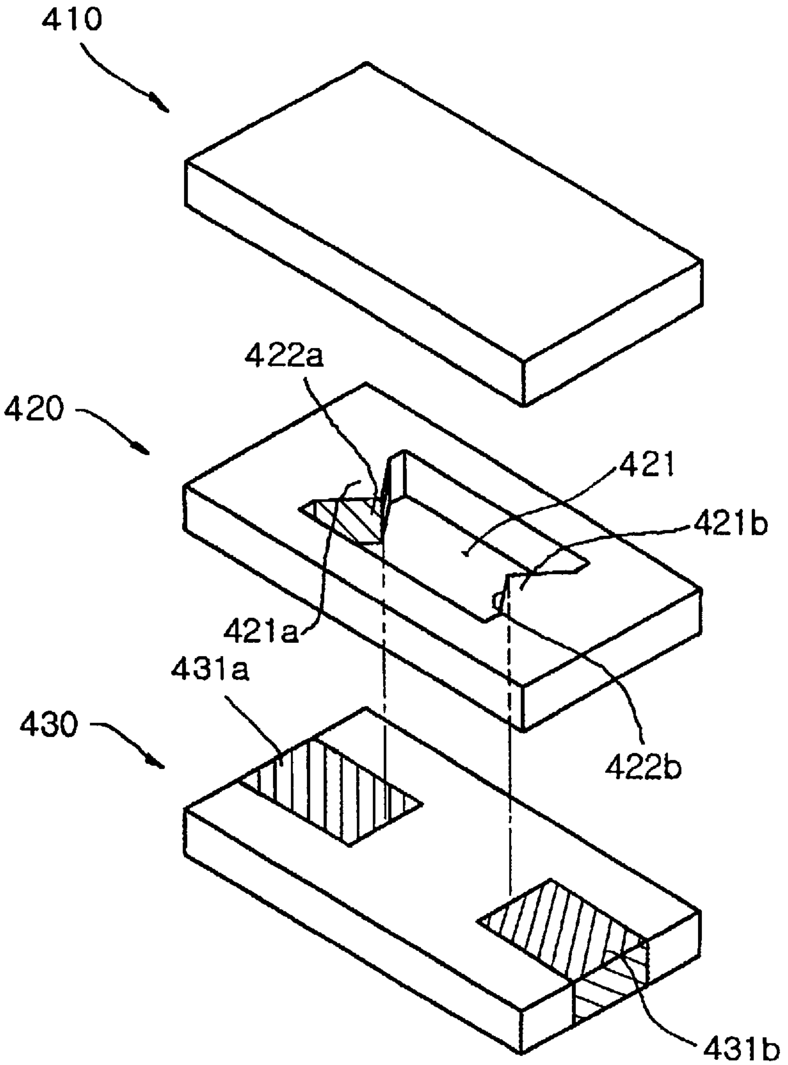
Figure 4B:
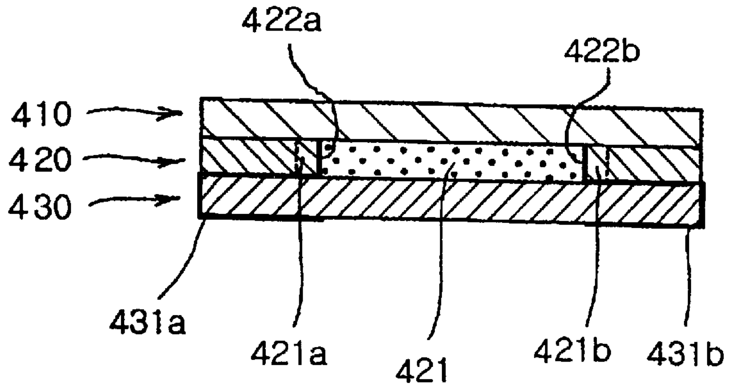
Figure 4C:
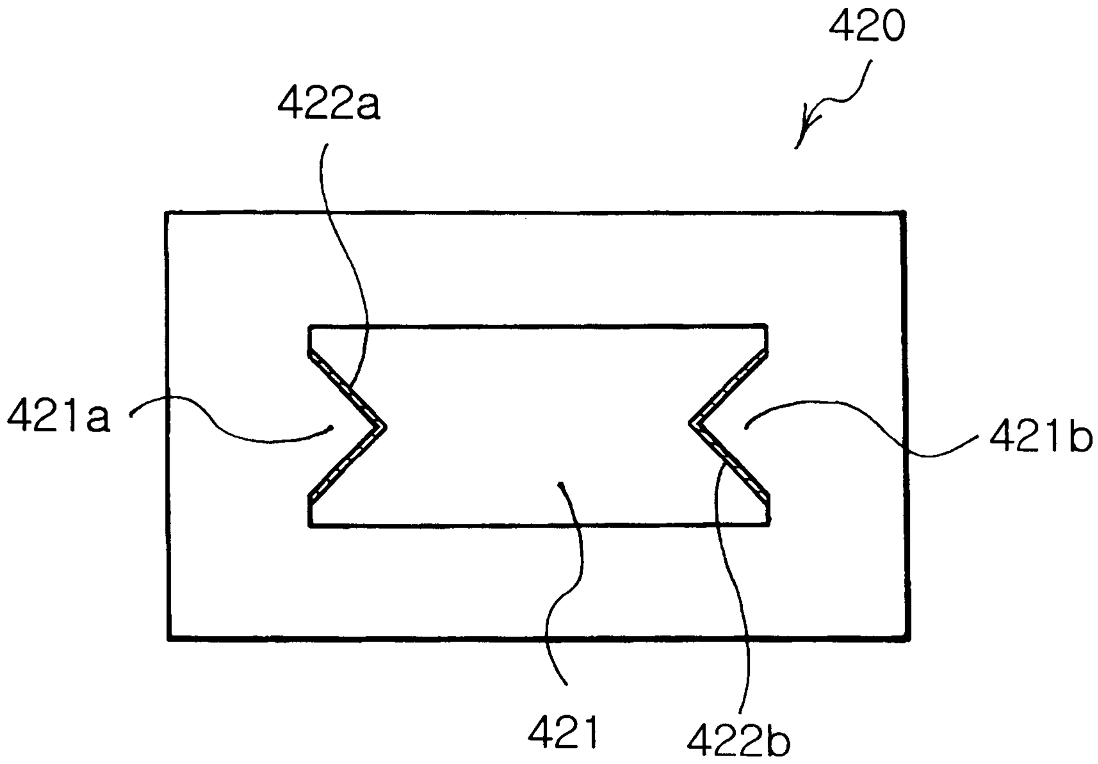

FIGS. 4*a*, 4*b* and 4*c* are views of an ESD device of the surface mount type in accordance with the second embodiment of the present invention, in which: FIG. 4*a* is an exploded perspective view of the device, FIG. 4*b* is a sectional view of the device with the parts assembled into a single body, and FIG. 4*c* is a bottom view of a middle insulating plate of the device. As shown in the drawings, the ESD device of the surface mount type according to this second embodiment has a triple-laminated structure comprising an upper cover plate 410, a middle insulating plate 420 and a lower cover plate 430. The middle insulating plate 420 is interposed between the upper and lower plates 410 and 430, and has a discharge opening 421 at the center.

The upper cover plate 410, made of a ceramic insulating material, is laminated on the upper surface of the middle plate 420, and hermetically seals the discharge opening 421, containing discharge gas therein, in cooperation with the lower cover plate 430, thus preventing gas leakage from the opening 421.

The middle plate 420 is made of an insulating material, and has the discharge opening 421 at the center. First and second discharge terminals 421*a* and 421*b* are formed in the middle plate 420 at opposite edges of the opening 421. A first signal electrode 422*a* and a first ground electrode 422*b* are formed on the middle plate 420 while respectively covering the surfaces of the first and second discharge terminals 421*a* and 421*b*, which face the discharge opening 421.

The lower cover plate 430, made of an insulating material, is laminated on the lower surface of the middle plate 420, and hermetically seals the discharge opening 421 in cooperation with the upper cover plate 410 by a sintering process. A second signal electrode 431*a* and a second ground electrode 431*b* are formed on the lower cover plate 430 at opposite edges. The second signal electrode 431*a* and the second ground electrode 431*b* respectively and partially cover the opposite edges of the lower plate 430 so as to come into electric contact with the first signal electrode 422*a* and the first ground electrode 422*b* of the middle plate 420.

As described above, the lower cover plate 430 is laminated on the lower surface of the middle plate 420, and hermetically seals the discharge opening 421, containing the discharge gas therein, in cooperation with the upper cover plate 410. That is, the upper and lower plates 410 and 430 seal the discharge opening 421 of the middle plate 420 to form a discharge cavity in the ESD device. This hermetically sealed discharge opening 421 contains discharge gas therein.

In the ESD device according to the second embodiment of this invention, the electric contact between the middle plate 420 and the lower plate 430 is accomplished by the electric contact between the electrodes of the two plates 420 and 430 as described above. In a detailed description, the first signal electrode 422*a* and the first ground electrode 422*b*, respectively covering the first and second discharge terminals 421*a* and 421*b* of the middle plate 420, may directly come into electric contact with the second signal electrode 431*a* and the second ground electrode 431*b* of the lower plate 430 without passing through the outer edges of the middle plate 420 as shown in FIGS. 4*a* to 4*c*.

Figure 5A:
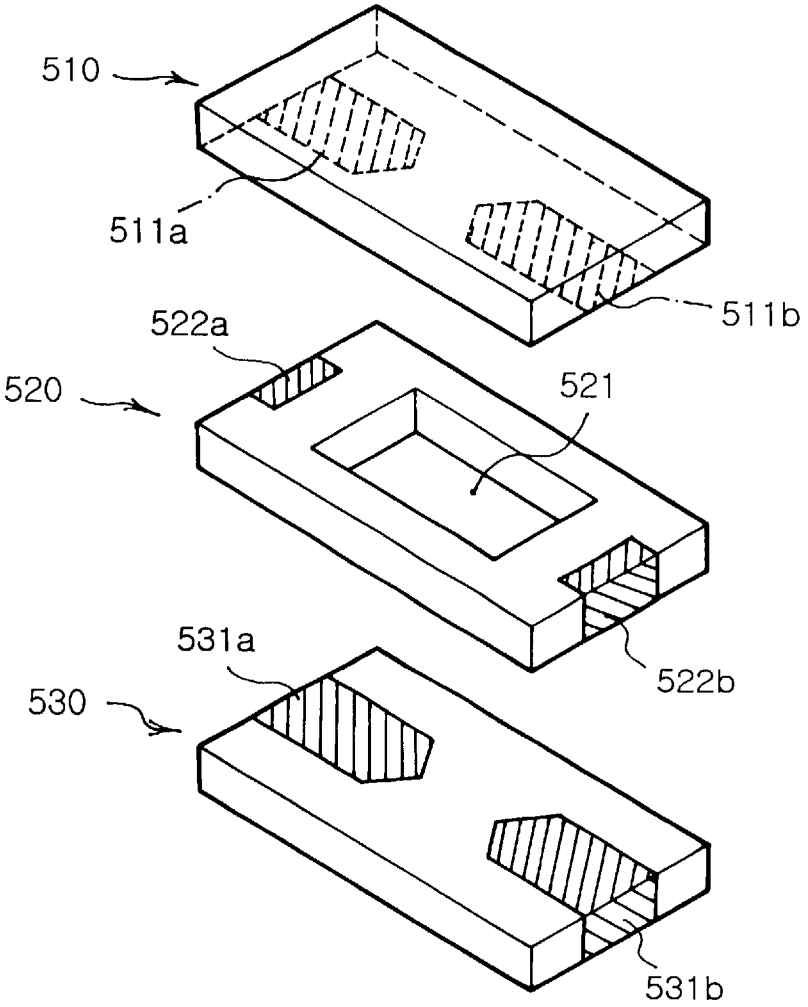
Figure 5B:
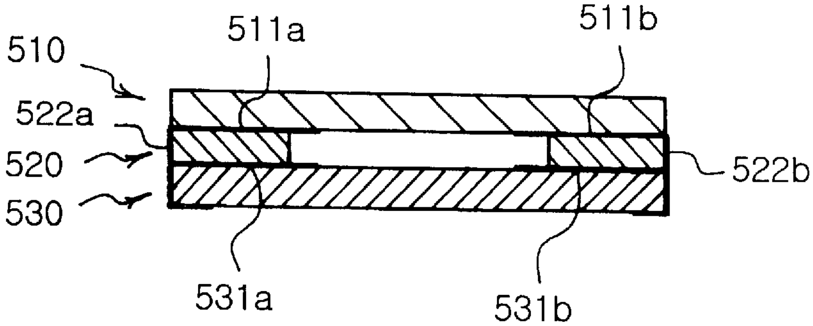
Figure 6:
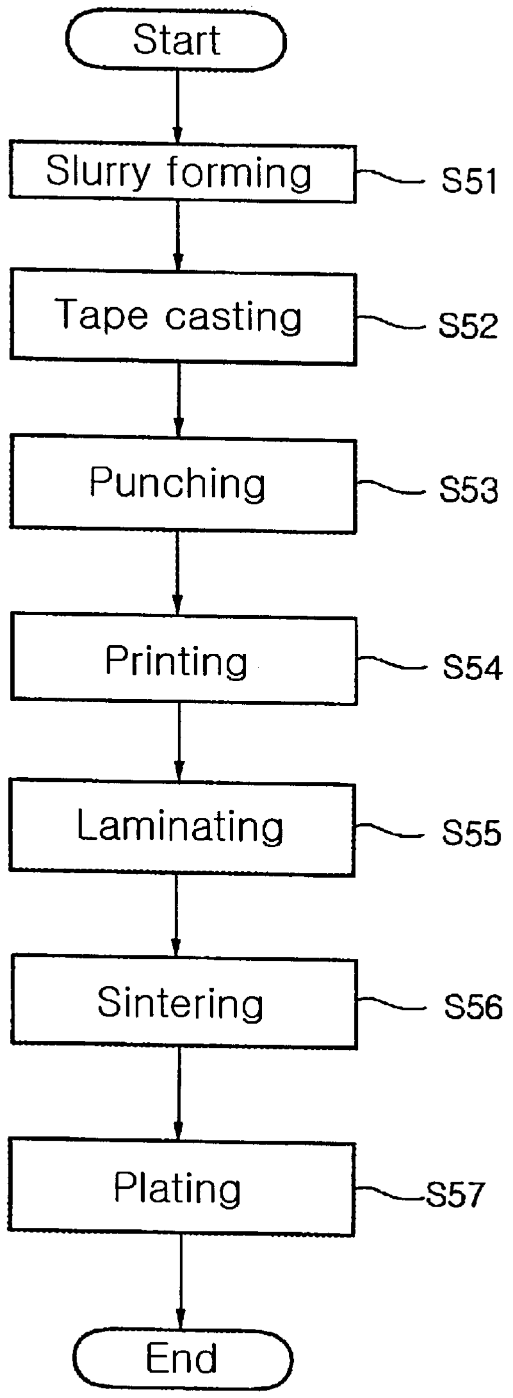
FIG. 6 is a flowchart of the process of fabricating the ESD device of this invention.

FIGS. 5*a* and 5*b* are views of an ESD device of the surface mount type in accordance with the third embodiment of the present invention, in which: FIG. 5*a* is an exploded perspective view of the device, and FIG. 5*b* is a sectional view of the device with the parts assembled into a single body. As shown in the drawings, the ESD device of the surface mount type according to this third embodiment has a triple-laminated structure comprising an upper cover plate 510, a middle insulating plate 520 and a lower cover plate 530. The middle insulating plate 520 is interposed between the upper and lower plates 510 and 530, and has a discharge opening 521 at the center.

The upper cover plate 510 is made of a ceramic insulating material, and is laminated on the upper surface of the middle plate 520. The upper cover plate 510 hermetically seals the discharge opening 521, containing discharge gas therein, in cooperation with the lower cover plate 530, thus preventing gas leakage from the opening 521. A first signal electrode 511*a* and a first ground electrode 511*b* are formed on the lower surface of the upper cover plate 510 at opposite positions. In such a case, the first signal electrode 511*a* and the first ground electrode 511*b* each have at least one triangular projection tip at their inside ends so as to effectively discharge electricity.

The middle plate 520 is made of an insulating material, and has the discharge opening 521 at the center. A second signal electrode 522*a* and a second ground electrode 522*b* are formed on opposite edges of the middle plate 520. The second signal electrode 522*a* and the second ground electrode 522*b* respectively and partially cover the opposite edges of the middle 520, and partially extend to upper and lower surfaces of said middle plate 520.

When the upper cover plate 510 is laminated on the middle plate 520, the first signal electrode 511*a* of the upper cover plate 510 is electrically connected to the second signal electrode 522*a* of the middle plate 520. In addition, the first ground electrode 511*b* of the upper cover plate 510 is electrically connected to the second ground electrode 522*b* of the middle plate 520.

The lower cover plate 530 is made of an insulating material, and is laminated on the lower surface of the middle plate 520. The lower cover plate 530 hermetically seals the discharge opening 521 in cooperation with the upper cover plate 510 through a sintering process. A third signal electrode 531*a* and a third ground electrode 531*b* are formed on the lower cover plate 530 at opposite edges. The third signal electrode 531*a* and the third ground electrode 531*b* respectively come into electric contact with the second signal electrode 522*a* and the second ground electrode 522*b* of the middle plate 520. The third signal electrode 531*a* and the third ground electrode 531*b* each have at least one triangular projection tip at their inside ends so as to effectively discharge electricity.

As described above, the lower cover plate 530 is laminated on the lower surface of the middle plate 520, and hermetically seals the discharge opening 521, containing the discharge gas therein, in cooperation with the upper cover plate 510. That is, the upper and lower plates 510 and 530 seal the discharge opening 521 of the middle plate 520 to form a discharge cavity in the ESD device. This hermetically sealed discharge opening 521 contains discharge gas therein.

In the primary and second embodiments of the present invention, the electric contact between the second signal electrode of the lower plate and the first signal electrode of the middle plate and the electric contact between the second ground electrode of the lower plate and the first ground electrode of the middle plate may be accomplished using a variety of electrode structures and a variety of electrode passages. In a brief description, the pattern, shape, and electric contact structure of the electrodes of the middle and lower plates in the ESD device according to the present invention are not limited to those of above-mentioned embodiments.

In order to allow smooth discharge from the discharge terminals of the middle plate, it is preferred to integrally form the two discharge terminals on the middle plate while forming at least one triangular projection tip at each of the two discharge terminals. In addition, the discharge terminals, formed on the inner surfaces of the discharge opening of the middle plate, may have a tooth-shaped profile, a triangular profile or another appropriate profile without affecting the functioning of the present invention.

The ESD device according to the primary and second embodiments of this invention is mounted on a PCB such that the lower surface of the lower plate is brought into contact with the PCB. Therefore, the second signal electrode of the lower plate comes into contact with the signal line of the PCB, while the second ground electrode of the lower plate is brought into contact with the ground surface of the PCB.

In the ESD device according to the third embodiment of this invention, the first and third signal electrodes, in addition to the first and third ground electrode, each have at least one triangular projection tip at their inside ends so as to effectively discharge electricity. In addition, the signal and ground electrodes, formed on the upper and lower cover plates, may have a tooth-shaped profile, a triangular profile or another appropriate profile without affecting the functioning of the present invention.

When the ESD device according to the third embodiment is mounted on a PCB, the lower surface of the lower plate is brought into contact with the PCB. Therefore, the third signal electrode of the lower plate comes into contact with the signal line of the PCB, while the third ground electrode of the lower plate is brought into contact with the ground surface of the PCB.

While designing the ESD device according to each of the primary, second and third embodiments of this invention, it is necessary to primarily predetermine an expected plasma ionization voltage in consideration of a desired protection level for a target electronic circuit and the plasma discharge characteristics of plasma discharge gas filling the discharge opening. Thereafter, the gap between the first and second discharge electrodes formed on the discharge terminals, the composition of the discharge gas and the size and structure of the discharge opening are appropriately designed to agree with the predetermined plasma ionization voltage characteristics.

The operational effect of the ESD device of the present invention will be described herein below.

During a process of manufacturing the ESD device of this invention, the upper and lower cover plates are hermetically formed on the upper and lower surfaces of the middle plate, thus forming a desired ESD device with the discharge opening of the middle plate completely sealed by the upper and lower cover plates. When static electricity, having a potential higher than the ionization potential of the plasma discharge gas contained in the discharge opening of the ESD device, is introduced into the discharge opening through a signal wire during an operation, the plasma discharge gas within the discharge opening is ionized to perform plasma discharge, thus reducing the voltage of the signal transmitting wire.

In a detailed description, when the voltage across the gap within the discharge opening between the first signal electrode and the first ground electrode of the middle plate is increased due to an application of static electricity surge to the ESD device of this invention during an operation to make the potential of the applied static electricity become higher than the ionization potential (reference potential) of the inert gas, or the plasma discharge gas contained in the discharge opening, the plasma discharge gas within the discharge opening is ionized to perform plasma discharge. Due to such plasma discharge of the plasma discharge gas, the voltage across the gap between the first signal electrode and the first ground electrode is preferably reduced.

In addition, the general discharge characteristics of the ESD device of this invention, such as the discharge start voltage and discharge time, are predetermined in accordance with the ionization characteristics of the plasma discharge gas filling the discharge opening of this ESD device and the size of the discharge opening. Therefore, it is possible to somewhat freely control the electric characteristics of the ESD device of this invention as desired by changing the composition of the plasma discharge gas and/or the size of the discharge opening.

The above-mentioned ESD device of this invention is fabricated through the following process, which will be described in detail herein below in conjunction with the accompanying drawings.

FIG. 5 is a flowchart of the process of fabricating the ESD device of this invention. As shown in the drawing, the process of fabricating the ESD device of this invention is a ceramic laminating process. In order to produce the ESD device of this invention, a slurry-forming step S51 is primarily performed to form ceramic slurry. At the slurry-forming step S51, ceramic powder is mixed with a binder and a solvent, such as water or an organic solution, to form desired ceramic slurry. While forming the ceramic slurry, it is more preferable to add both a dispersing agent for uniformly dispersing the ceramic powder in the solvent, and a plasticizer for giving a desired flexibility to the bound ceramic powder, to the ceramic slurry.

After the slurry-forming step S51, a tape-casting step S52 is performed. At the tape-casting step S52, the ceramic slurry from the step S51 is applied to a PET film (polyethylene terephthlate film) to form a slurry layer having a desired thickness using a doctor blade. The slurry layer on the PET film is, thereafter, dried using a high temperature air current, thus forming a ceramic green sheet. Thereafter, a punching step S53 is performed. At the punching step S53, the ceramic green sheet is cut into desired plates having desired sizes agreeing with the size of a desired ESD device, thus forming upper, middle and lower plates. In addition, the middle plate is punched again to primarily form a discharge opening at the center of said middle plate. Thereafter, the middle plate having the discharge opening is secondarily machined to form the two discharge terminals at opposite edges of the discharge opening, thus precisely forming the desired discharge opening having a desired size on the middle plate with two discharge terminals having desired shapes and sizes.

Thereafter, a printing step S54 is performed. At the printing step S54, desired electrodes are printed on the middle and lower plates at predetermined positions. Thereafter, a lamination step S55 is performed to laminate the upper, middle and lower plates together to integrate them into a laminated single body. The laminated body from the lamination step S55 is, thereafter, subjected to a binder burn-out step, wherein a variety of organic substances laden in the laminated body, such as a binder, a dispersing agent and a plasticizer, except for ceramic powder, are burnt out. The laminated body from the binder burn-out step is, thereafter, subjected to a sintering step S56. At the sintering step S56, the laminated single body is sintered under a plasma gas environment to fill plasma discharge gas in the discharge opening of the laminated body.

When the laminated body is sintered under the plasma gas environment, plasma discharge gas fills the discharge opening of the laminated body, and the opening is hermetically sealed to prevent leakage of the plasma discharge gas from the opening. Therefore, a desired ESD device of this invention is fabricated. In such a case, it is necessary to select appropriate plasma discharge gas in accordance with predetermined ionization characteristics of the plasma discharge gas.

After the sintering step S56, a plating step S57 is performed to sequentially plate nickel and lead (Sn or Sn/Pb) on desired soldering areas of the electrodes of the ESD device.

When the ESD device of the surface mount type according to this invention is fabricated through a ceramic laminating process as described above, it is possible to easily and simply produce desired ESD devices of the surface mount type at a low production cost.

As described above, the present invention provides an ESD device of the surface mount type and a method of easily and simply fabricating such ESD devices through a ceramic laminating process. The ESD device of this invention is easily installed on a PCB through a surface mounting process, and is effectively usable for protecting electronic circuits or electronic parts from electrostatic damage. The ESD devices of this invention are easily and simply produced through a ceramic laminating process at a low production cost.

The ESD device of this invention also improves the operational reliability of the electronic circuit of an apparatus. In addition, the ESD device is mounted on the electronic circuit through a surface mounting process without consuming an excessive area for installation of the ESD device, thus accomplishing the recent trend of compactness, lightness and smallness of the apparatus.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electrostatic discharge device of the surface mount type, comprising:

an upper cover plate made of an insulating material;

a middle insulating plate made of an insulating material and laminated on a lower surface of said upper cover plate, and having a discharge opening, with first and second discharge terminals formed in said middle insulating plate at opposite edges of said discharge opening; and a lower cover plate made of an insulating material and laminated on a lower surface of said middle insulating plate, and sealing said discharge opening of said middle insulating plate in cooperation with said upper cover plate, said lower cover plate having a second signal electrode brought into electric contact with said first discharge terminal of said middle insulating plate, and a second ground electrode brought into electric contact with said second discharge terminal of said middle insulating plate, whereby discharge gas fills said discharge opening of said middle insulating plate sealed by said upper and lower cover plates.

2. The electrostatic discharge device according to claim 1, wherein said middle insulating plate further comprises:

a first signal electrode bringing said first discharge terminal of said middle insulating plate into electric contact with said second signal electrode of said lower cover plate; and a first ground electrode bringing said second discharge terminal of said middle insulating plate into electric contact with said second ground electrode of said lower cover plate.

3. The electrostatic discharge device according to claim 2, wherein said discharge opening of said middle insulating plate is predetermined in its size so as to have desired ionization voltage characteristics in consideration of both a gap between said first and second discharge terminals and a composition of the discharge gas filling said discharge opening.

4. The electrostatic discharge device according to claim 3, wherein each of said first and second discharge terminals of said middle insulating plate includes at least one triangular projection tip formed at each of said opposite edges of said discharge opening, and is integrally formed on said middle insulating plate.

5. An electrostatic discharge device of the surface mount type, comprising:

an upper cover plate made of an insulating material, with a first signal electrode and a first ground electrode formed on a lower surface of said upper cover plate at opposite positions;

a middle insulating plate made of an insulating material and laminated on the lower surface of said upper cover plate, and having a discharge opening, with a second signal electrode and a second ground electrode formed on opposite edges of said middle plate such that the second signal and ground electrodes are electrically connected to the first signal and ground electrodes of said upper cover plate; and a lower cover plate made of an insulating material and laminated on a lower surface of said middle insulating plate, and sealing said discharge opening of said middle insulating plate in cooperation with said upper cover plate, said lower cover plate having a third signal electrode and a third ground electrode respectively and electrically connected to the second signal and ground electrodes of said middle plate;

whereby discharge gas fills said discharge opening of said middle insulating plate sealed by said upper and lower cover plates.

6. The electrostatic discharge device according to claim 5, wherein the first signal electrode and first ground electrode each include at least one triangular projection tip at their inside ends.

7. The electrostatic discharge device according to claim 6, wherein said third signal electrode and third ground electrode each include at least one triangular projection tip at their inside ends.

* * * * *